(12) United States Patent
Hamer et al.

(10) Patent No.: US 8,674,568 B2
(45) Date of Patent: Mar. 18, 2014

(54) MACHINE WITH HIGH VOLTAGE ENCLOSURE COVER

(75) Inventors: Colin James Hamer, Noblesville, IN (US); Brad D. Chamberlin, Pendleton, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 219 days.

(21) Appl. No.: 13/355,941

(22) Filed: Jan. 23, 2012

(65) Prior Publication Data

US 2012/0187784 A1    Jul. 26, 2012

Related U.S. Application Data

(60) Provisional application No. 61/435,125, filed on Jan. 21, 2011.

(51) Int. Cl.
*H02K 11/00* (2006.01)

(52) U.S. Cl.
USPC ............................. 310/71; 310/89

(58) Field of Classification Search
USPC .......................... 310/71, 89, 68 R
See application file for complete search history.

(56) References Cited

U.S. PATENT DOCUMENTS

| | | | | |
|---|---|---|---|---|
| 3,784,727 A | * | 1/1974 | Haubein | 174/562 |
| 4,005,253 A | * | 1/1977 | Walter | 174/37 |
| 5,847,655 A | | 12/1998 | Nourrcier | |
| 7,902,720 B2 | * | 3/2011 | Ishikawa et al. | 310/317 |
| 2003/0137786 A1 | * | 7/2003 | Hasegawa et al. | 361/10 |
| 2004/0195923 A1 | * | 10/2004 | Staigl et al. | 310/71 |
| 2005/0266740 A1 | | 12/2005 | Kikuchi et al. | |
| 2008/0042498 A1 | * | 2/2008 | Beer | 310/42 |
| 2008/0084129 A1 | * | 4/2008 | Utsunomiya et al. | 310/71 |
| 2011/0095659 A1 | * | 4/2011 | Hattori et al. | 310/68 D |
| 2012/0104878 A1 | * | 5/2012 | Heilman et al. | 310/43 |

FOREIGN PATENT DOCUMENTS

| | | |
|---|---|---|
| JP | 09173236 | 7/1997 |
| JP | 2005078840 | 3/2005 |

OTHER PUBLICATIONS

International Search Report and Written Opinion dated Aug. 22, 2012 for Application No. PCT/US2012/022221.

* cited by examiner

*Primary Examiner* — Thanh Lam
(74) *Attorney, Agent, or Firm* — Cantor Colburn LLP

(57) ABSTRACT

A machine includes a high voltage element and an enclosure surrounding the high voltage element. The enclosure includes a first insulating insert disposed at least partially within a first wall and being electrically non-conductive and surrounding a first conductive insert and an enclosure cover formed at least partially of an electrically non-conducting substrate and having a first opening formed therein sized to allow a first fastener or an extension of the first conductive insert to pass through it. Removal of the enclosure cover causes the high high-voltage element to cease operating.

24 Claims, 8 Drawing Sheets

MACHINE WITH HIGH VOLTAGE ENCLOSURE COVER

BACKGROUND OF THE INVENTION

The present invention is directed to machines, and, in particular, to disabling a machine having or located in an enclosure when a portion of the enclosure is opened.

Technological advances have led to changes in the design of automobiles. For example, hybrid vehicles that include both a standard internal combustion engine (ICE) and an electric motor are now available. These vehicles typically have improved fuel economy as compared to a vehicle including only an ICE.

Hybrid vehicles require electrical power at levels that far exceed the 12 to 24 volts at which ICE's operate in order to drive the electric motor. The motors can use batteries, ultra-capacitors, fuel cells, or other sources to power the electric motor that drives the vehicle in some operating conditions. The voltage from these power sources are typically stepped up to a higher voltage and then provided to the motor. Transversely, when braking, the high voltage from the motor is stepped down and used to recharge the power sources.

The elements involved in stepping the power up and down (as well as other devices) are typically located in a protective enclosure. The elements in the protective enclosure are referred to herein as "electrical elements" or "high voltage elements." The enclosure keeps the electrical elements safe and prevents individuals from harming themselves by touching them. Such enclosures shall be referred to herein as "high voltage enclosures." At times, a person may need to access electrical elements within the high voltage enclosure for service. In order to make such access safe and to reduce or remove the possibility of an electrical shock, the high voltage enclosure typically includes a mechanical switch that cuts the power supply to the electrical elements when an access cover of the enclosure is removed. The switches are typically connected to a high voltage interlock loop. That is, the power cannot be returned to the electrical elements until the switch is activated (opened or closed depending on orientation). In practice, the access cover is typically formed of metal to provide electromagnetic or radiofrequency shielding and includes a tab or other implement to activate the switch.

BRIEF DESCRIPTION OF THE INVENTION

Disclosed in one embodiment is a machine that includes a high voltage element and an enclosure surrounding the high voltage element. In this embodiment, the enclosure includes a first wall formed of an electrically conductive material, a first insulating insert disposed at least partially within the first wall and being electrically non-conductive, a first conductive insert at least partially disposed within the first insulating insert, and an enclosure cover formed at least partially of an electrically non-conducting substrate and having a first opening formed therein sized to allow a first fastener or an extension of the first conductive insert to pass through it. In this embodiment, the substrate includes a first conductor terminating at a first location at or near an edge of the first opening and a second conductor terminating at a second location at or near an edge of the first opening and separated from the first location. The first and second conductors are electrically coupled to one another through the first conductive insert when the enclosure cover is placed into contact with the first conductive insert and electrically isolated from one another when the enclosure cover is at least partially removed from contact with the first wall.

Disclosed in another embodiment is a machine that includes a high voltage element and an enclosure surrounding the high voltage element. In this embodiment, the enclosure includes a first wall formed of an electrically non-conductive material, a first conductive insert at least partially disposed within the first wall, and an enclosure cover formed at least partially of an electrically non-conducting substrate and having a first opening formed therein sized to allow either a first fastener or an extension of the first conductive insert to pass through it. In this embodiment, the substrate includes a first conductor terminating at a first location at or near an edge of the first opening and a second conductor terminating at a second location at or near an edge of the first opening and separated from the first location, the first and second conductors are electrically coupled to one another through the first conductive insert when the enclosure cover is placed into contact with the first conductive insert and electrically isolated from one another when the enclosure cover is removed from contact with the first wall.

Disclosed in another embodiment is a dynamoelectric machine that includes a high voltage element and an outer housing surrounding the high voltage element. In this embodiment, the outer housing includes a first wall formed of an electrically conductive material, a first insulating insert disposed at least partially within the first wall and being electrically non-conductive, and a first conductive insert at least partially disposed within the insulating insert. The dynamoelectric machine also includes an enclosure cover formed at least partially of an electrically non-conducting substrate and having a first opening formed therein sized to allow a first fastener or an extension of the first conductive insert to pass through it, the substrate including a first conductor terminating at a first location at or near an edge of the first opening and a second conductor terminating at a second location at or near an edge of the first opening and separated from the first location, the first and second conductors are electrically coupled to one another through the first conductive insert when the enclosure cover is placed into contact with the first conductive insert and electrically isolated from one another when the enclosure cover is at least partially removed from contact with the first wall.

Disclosed in another embodiment is a machine that includes a high voltage element and an enclosure surrounding the high voltage element. The enclosure of this embodiment includes an insulating insert including an opening formed in a face thereof, a conductive trace formed within the opening and electrically connecting two locations within the opening, and an enclosure cover formed at least partially of an electrically non-conducting substrate and having a first conductor terminating at a first location and a second conductor terminating at a second location separated from the first location, the first and second conductors are electrically coupled to one another through the conductive trace when the enclosure cover is placed into the opening and electrically isolated from one another when the enclosure cover is removed from the opening.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Exemplary embodiments provide for a high voltage enclosure having a removable access cover. The cover is formed, in one embodiment, as a printed circuit board having at least two traces formed thereon and electrically separated from each other. When the access cover is secured to the high voltage enclosure it completes a safety circuit. When the access cover is removed, the safety circuit is opened. When opened, power is diverted from electrical elements in the high voltage enclosure to protect an individual.

Figure 1:
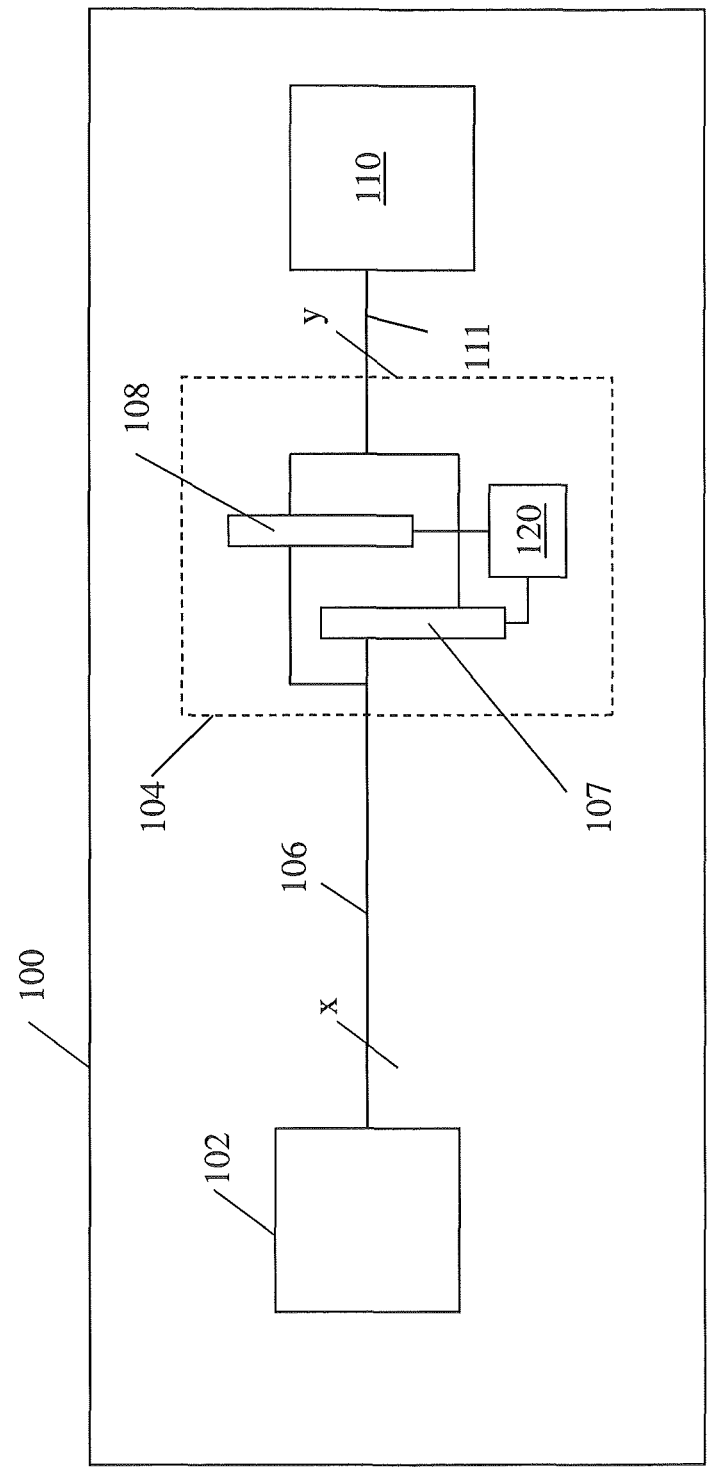
FIG. 1 depicts a block diagram of a machine in or on which embodiments of the present invention can be implemented.

FIG. 1 illustrates a machine 100 in which embodiments of the present invention can be implemented. The machine 100 can be any type of machine and, in one embodiment, is a hybrid vehicle. In another embodiment, the machine 100 is an electric motor that is included in a vehicle. In yet another embodiment, the machine 100 is a hybrid engine that includes both an ICE and an electric engine The machine 100 includes a power supply 102. In one embodiment, the power supply 102 is formed of one or more electrical power producing devices such as batteries, fuel cells, ultracapacitors or other devices capable of producing voltage and current (e.g., power) at their output. The power producing devices can be configured in series, parallel, or any other configuration.

The power supply 102 can both produce and store power in one embodiment. The power supply 102 provides power to and receives power from a high voltage enclosure 104 over one or more conductors 106. The high voltage enclosure 104 includes one or more electrical elements (e.g. a direct current (DC) to alternating current (AC) converter, a rectifier, or transformer) generally shown as element 107 that convert the power received from power supply 102 to a suitable level and frequency for operating the electric motor 110. The high voltage enclosure 104 also includes, in one embodiment, one or more elements, generally shown as element 108, for providing power from the electric motor 110 to the power supply 102 during regenerative braking. That operation and configuration of the components 107 and 108 can vary and is not limited to that shown in FIG. 1.

The high voltage enclosure 104 can also include elements in addition to or instead of "high voltage" elements 107, 108. As such, the enclosure 104 may also be referred to herein simply as an "enclosure." In one embodiment, one or more of the elements 107, 108 in the enclosure 104 are coupled to a switch element 120 that, upon determining that the enclosure 104 has been opened, provides a signal to a controller (not shown) that causes power to be diverted from or otherwise removed from the elements 107, 108. The operation of the controller is known in the art and not discussed further herein.

In one embodiment, when the switch element 120 is opened, power ceases to be provided to one or more of the elements 107, 108.

Figure 2:
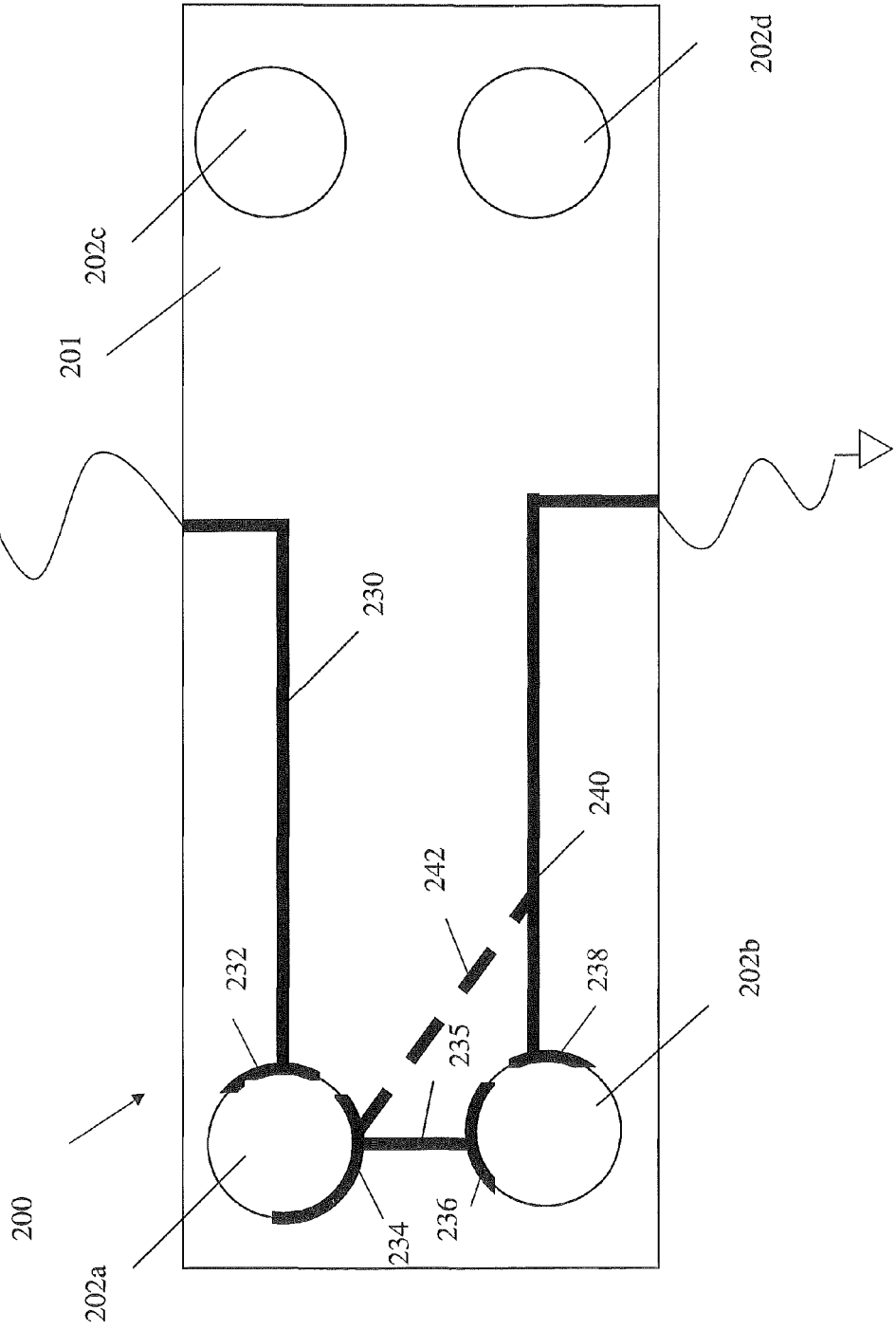
FIG. 2 depicts a bottom view of an access cover according to one embodiment.

FIG. 2 illustrates a bottom view of an access cover 200 according to one embodiment. In this embodiment, the access cover 200 includes portions of the switch element 120 shown in FIG. 1. The access cover 200 is formed of one or more layers of non-conducting material. For example, the access cover 200 is formed of a material from which a printed circuit board can be made such as (Teflon), FR-4, FR-1, CEM-1, CEM-3, FR-2 (Phenolic cotton paper), FR-3 (Cotton paper and epoxy), FR-4 (Woven glass and epoxy), FR-5 (Woven glass and epoxy), FR-6 (Matte glass and polyester), G-10 (Woven glass and epoxy), CEM-1 (Cotton paper and epoxy), CEM-2 (Cotton paper and epoxy), CEM-3 (Woven glass and epoxy), CEM-4 (Woven glass and epoxy), or CEM-5 (Woven glass and polyester). The access cover 200 can also include one or more conductive layers formed of, for example, copper. In FIG. 2, however, the illustrated substrate 201 is formed of a non-conductive material.

As described above, the access cover 200 can be secured to and seal off entry to a high voltage enclosure. It should also be appreciated that the access cover 200 could alternatively be utilized with any type of dynamoelectric machine as is more fully described below. In one embodiment, the access cover 200 can form part of the switch element 120. That is, in one embodiment, the removal of the access cover 200 from the enclosure causes the switch element 120 (FIG. 1) to trip and, as such, power is diverted from or otherwise removed from elements within the enclosure. In the case where the access cover 200 is utilized with a dynamoelectric machine, removal of access cover 200 will cause a controller or other device to cause the machine to stop operating or otherwise prevent it from outputting a voltage that could harm an individual.

Figure 3:
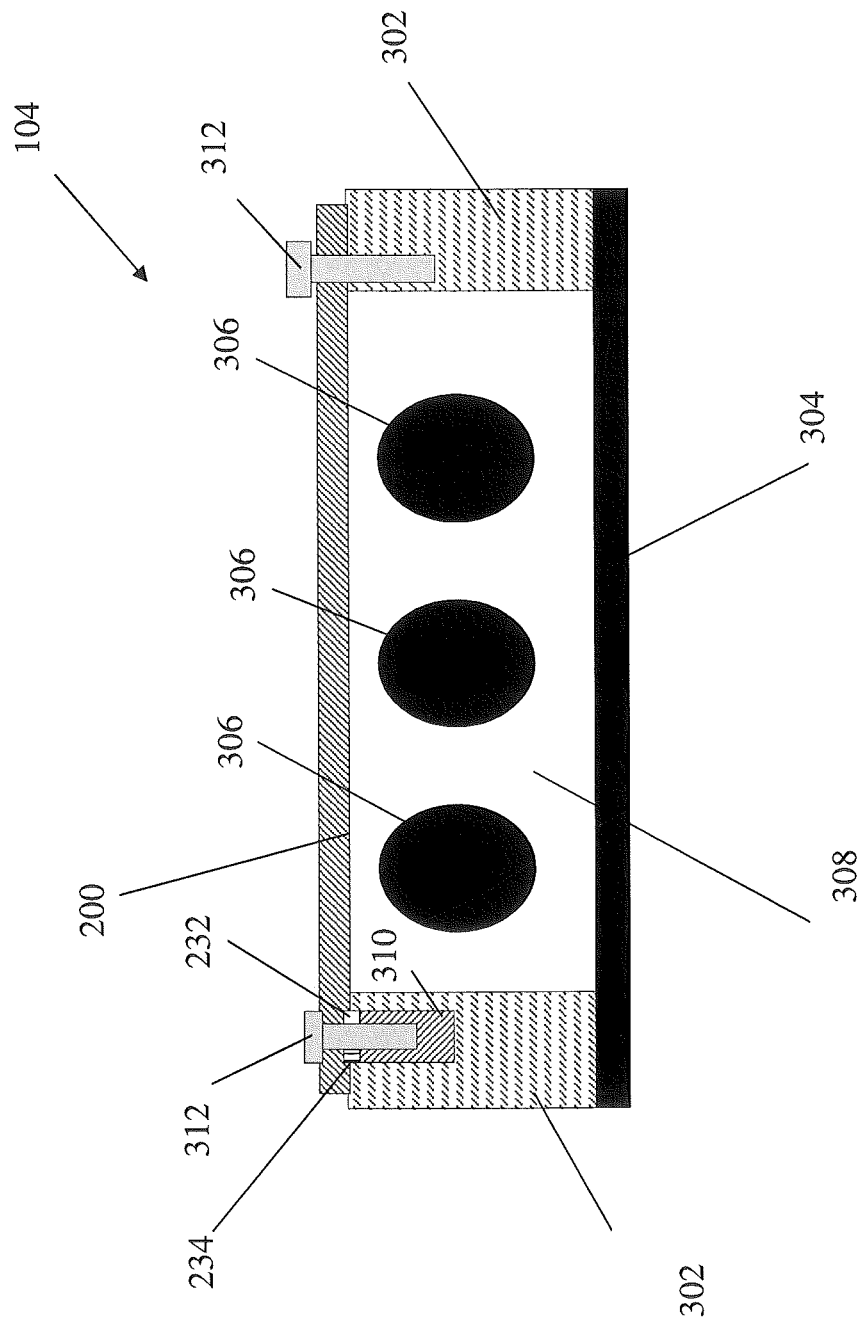
FIG. 3 is a cut-away side view of a high voltage enclosure having a cover according to one embodiment.

FIG. 3 shows a cut-away side-view of an enclosure 104 according to one embodiment. The enclosure 104 illustrated in FIG. 3 includes sidewalls 302 and a bottom 304. In one embodiment, the sidewalls 302 are formed of an electrically non-conductive material. The bottom 304 can be formed of either an electrically conductive or non-conductive material.

In use, the access cover 200 is coupled to one or more of the sidewalls 302 and covers the enclosure 104 such that a person cannot access elements 306 contained in an interior region 308 of the enclosure 104. At least one of the sidewalls 302 includes a conductive insert 310. The conductive insert 310 electrically couples two separate pieces of conductive material located at or near an edge of an opening in the substrate 200 through which a fastener 312 passes. The fastener 312 causes the conductive material to contact the conductive insert 310 and, thereby, electrically couples the two pieces of conductive material.

Figure 4:
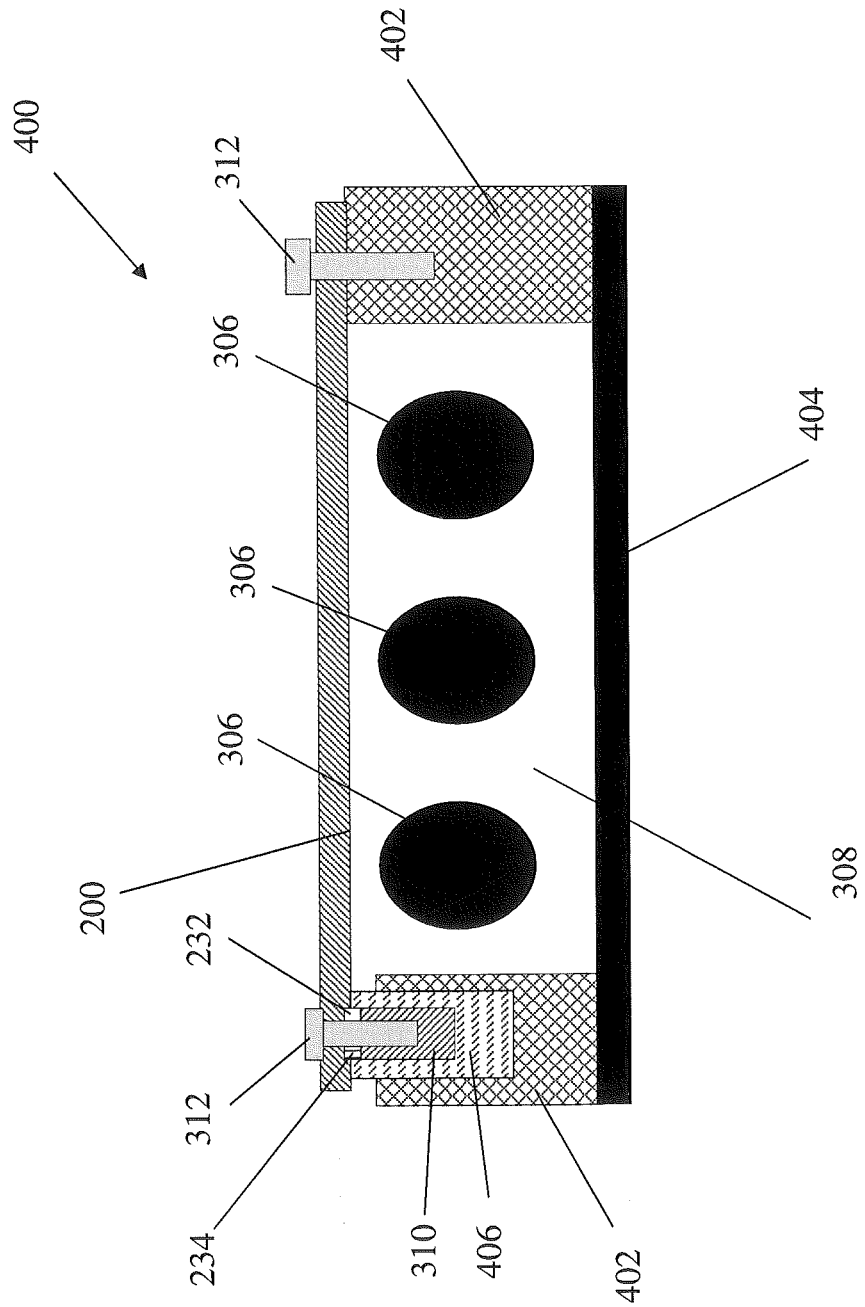
FIG. 4 is a cut-away side view of a high voltage enclosure having a cover according to an alternative embodiment.

FIG. 4 illustrates a cut-away side view of an alternative embodiment of an enclosure 400. In this embodiment, the enclosure 400 includes sidewalls 402 and a bottom 404. In this embodiment, the sidewalls 402 are formed of an electrically conductive material. This embodiment could exist, for example, in the case of a dynamoelectric machine. The enclosure 400 in such an embodiment could be, for example the housing of the dynamoelectric machine. In particular, the enclosure could be the housing of an electric motor or electric generator. The bottom 404 can be formed of either an electrically conductive or electrically nonconductive material. One or more of the sidewalls 402 include an insulating insert 406 disposed within it. The insulating insert 406 surrounds the conductive insert 310 and electrically isolates it from the sidewall 402.

Similar to as described above, in, the access cover 200 shown in FIG. 4 is coupled to one or more of the sidewalls 402 and covers the enclosure 400 such that a person cannot access elements 306 contained in an interior region 308 of the enclosure 400. The elements 306 could be, for example, the high voltage coils of an electric motor or electric generator in one embodiment. Of course, the elements 306 could be any other type of element and, in particular, any element typically contained in an electric motor or electric generator.

At least one of the sidewalls 402 includes an insulating insert 406 that surround a conductive insert 310. The insulating insert 406 could be formed as a single element that contain one or more inserts or could be formed as a plurality of elements, one for each conductive inserts utilized. The conductive insert 310 electrically couples two separate pieces of conductive material located at or near an edge of an opening formed in the substrate 200 through which a fastener 312 passes. The fastener 312 causes the conductive material to contact the conductive insert 310 and, thereby, electrically couples the two pieces of conductive material.

Figure 5:
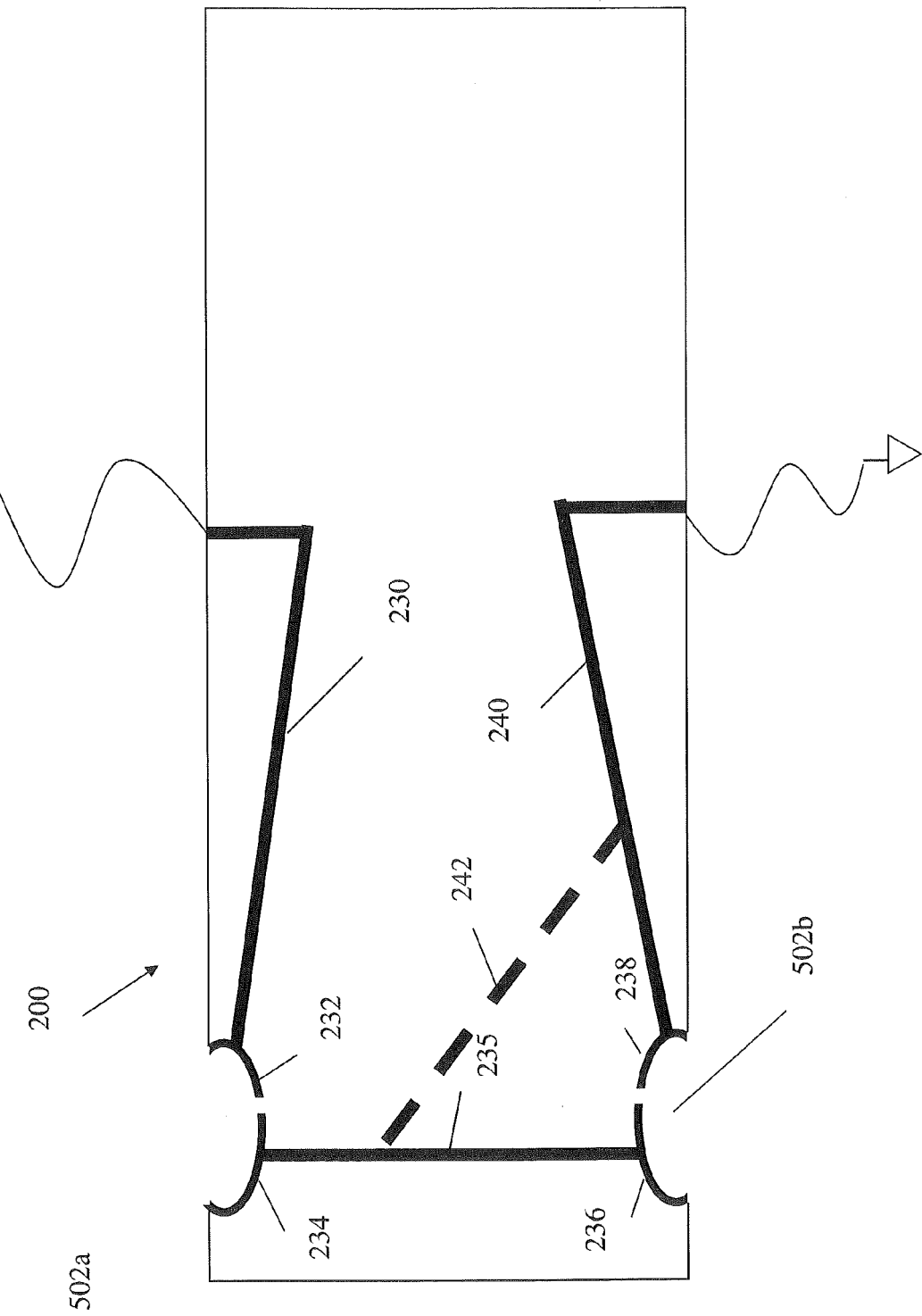
FIG. 5 depicts a bottom view of an access cover according to another embodiment.

Referring now to FIGS. 2 to 4, the substrate 201 includes one or more openings 202 through which fastener 312 may pass. As illustrated, the substrate 201 includes four openings 202a, 202b, 202c and 202d. The number of openings 202 can be varied to suit the application. In one embodiment, the substrate includes one or more openings 202. It shall be understood that the openings 202 could be holes as shown in FIG. 2 or could be formed as cutout sections as illustrated in FIG. 5. In FIG. 5, the openings are labeled with reference numeral 502.

In general terms, the substrate 201 has formed thereon two or more connectors (230, 232, 234, 235, 236, 238, 240 and 242) that provide an electrical path between V+ and ground (or another reference potential) when the substrate 200 is arranged in a position such that a person cannot contact elements 306 in the interior region 308. When the substrate 200 is removed, or the fasteners 312 loosened, V+ is separated from ground creating an open circuit. Such an open circuit can be detected. When the open circuit is detected (as in the prior art) power is no longer provided to or generated by the elements 306.

In more detail, the substrate 201 illustrated in FIG. 2 includes a first conductor 230 formed thereon. In one embodiment, one or more of the conductors are formed of copper and the substrate is an electrically non-conductive material. In the prior art, the access (cover) was typically formed of metal to shield elements outside of the interior region 308 from interference from electromagnetic or radiofrequency energy created by elements 306. For the purposes of the present invention, all that is required is that substrate 201 have at least a portion on which conductors can be integrally formed and electrically isolated from one another.

As illustrated, the first conductor 230 is electrically coupled to a first opening first connector element 232. The first opening first connector element 232 is formed at or near an edge of the first opening 202a. A first opening second connector element 234 is formed on a different and separate portion of the substrate 201 such that it is electrically separated from the first opening first connector element 232 when the substrate 201 is removed from the enclosure. As illustrated, the first opening second connector element 234 is located at or near an edge of the first opening 202a As illustrated, the first opening second connector element 234 is electrically coupled to a second conductor 235. The second conductor 235 electrically couples the first opening second connector element 234 to a second opening first connector element 236 that is located at or near an edge of the second opening 202b. The second opening 202b also has a second opening second connector element 238 located at or near its edge and which is electrically (and physically) separated from the second opening first connector element 236. The second opening second connector element 236 is electrically coupled to ground via second conductor 240.

It shall be understood that one or more openings 202 could be included between V+ and ground. As such, the configuration shown in FIG. 2 is merely illustrative. In one embodiment, the first opening second connector element 234 is directly coupled to ground by third connector 242. In such an embodiment, the elements identified by reference numerals 234, 235, 236 and 238 can be omitted.

When the fastener 312 is mated with the conductive insert 310 it can bias the substrate 201 to the conductive insert 310. In such a manner, the fastener 312 causes at least connector elements 232 and 234 to contact and form an electrical connection to the conductive insert 310. As such, current can flow from V+ through first conductor 230 to first opening first conductor 232. This current then travels through the conductive insert 310 to first opening second conductor 234. However, when the fastener 312 is loosed or removed and/or the enclosure cover 200 is removed, the conduction path is broken and appropriate measures can be taken to ensure that an individual is not harmed by contact with elements 306. The fastener 312 may be, for example, a screw, a bolt or other fastener that is configured to mate with the conductive insert 310. In one embodiment, the fastener 312 is non-conducting so that it cannot provide a conduction path between conductors located at or near edges of the openings 202.

Figure 6:
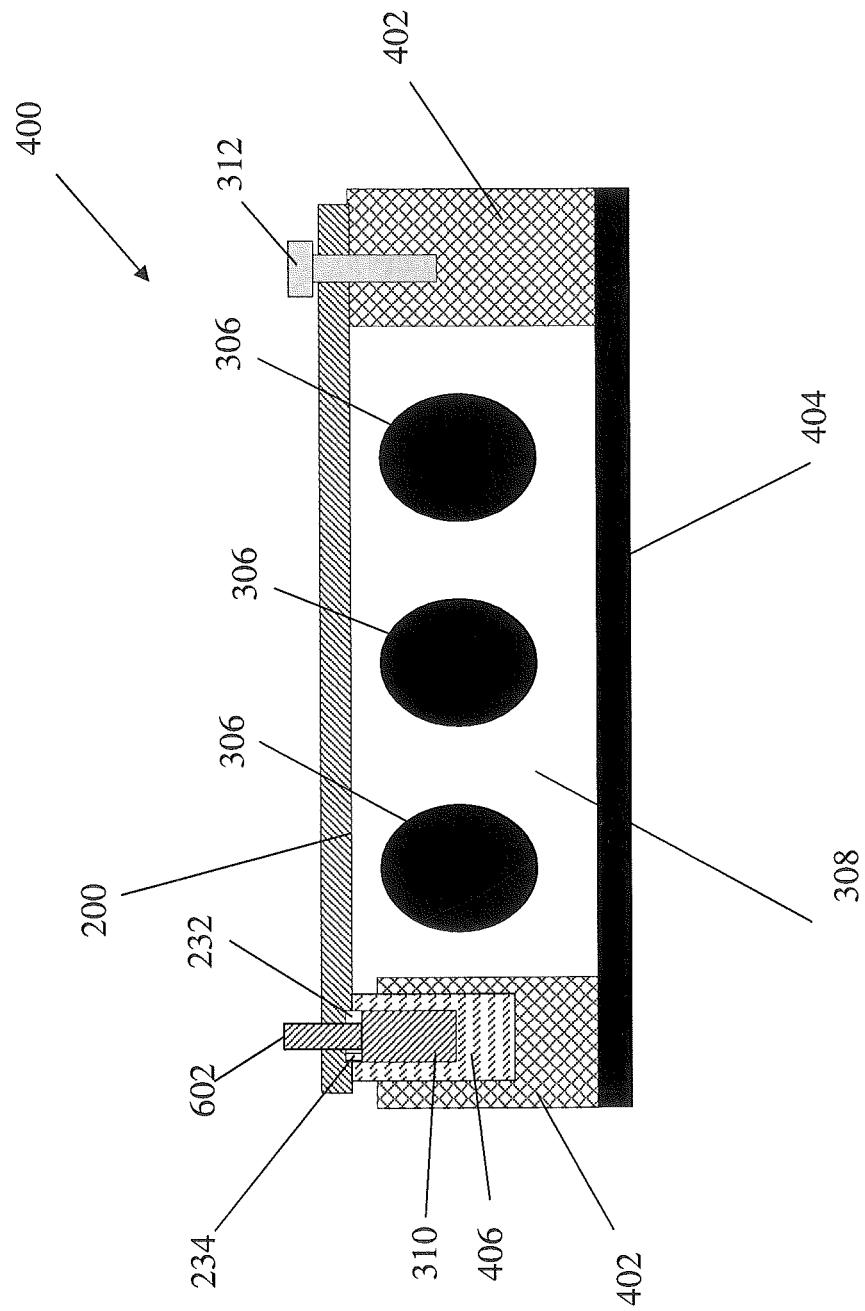
FIG. 6 is a cut-away side view of a high voltage enclosure having a cover according to an alternative embodiment.

In the previous example it was assumed that a fastener would pass through an opening formed in the substrate and cause the conductors formed on the substrate to contact the conductive inserts 310. It shall be understood, and as is shown in FIG. 6, the conductive inserts 310 could include an extension 602 that extends outwardly from the insulating insert 406 or the non-conductive sidewalls 302 shown in FIG. 3.

Figure 7:
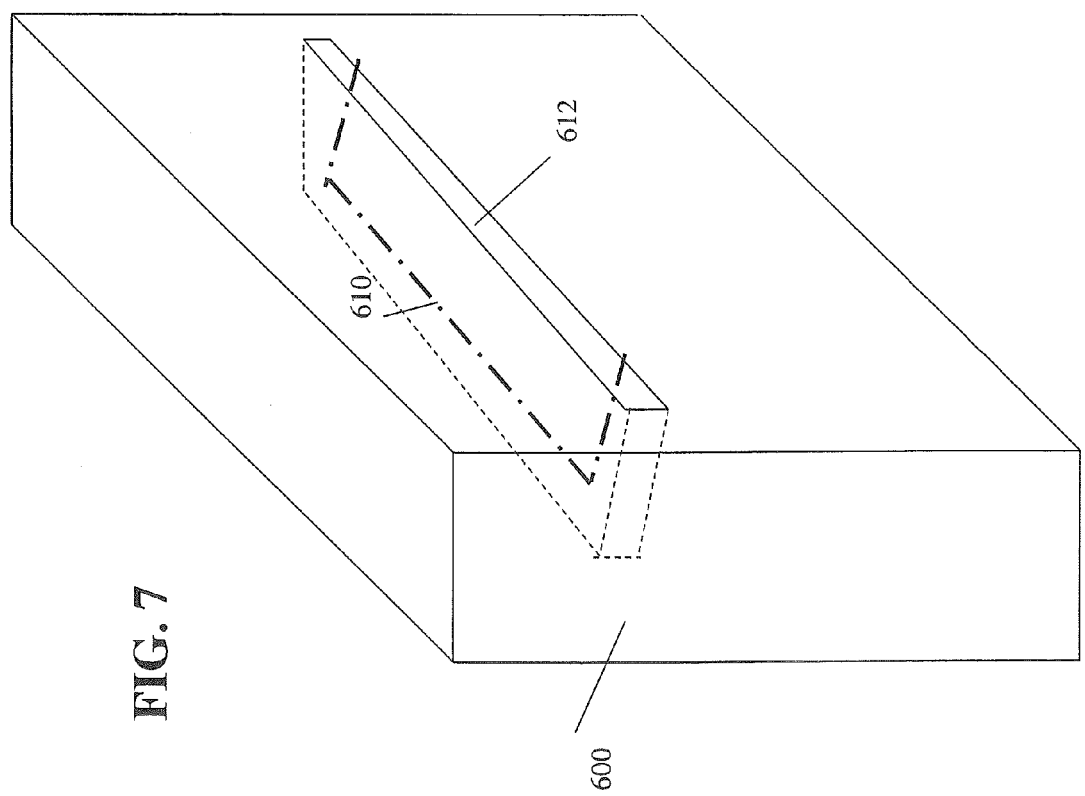
FIG. 7 illustrates a conductive insert according to one embodiment.

In another embodiment, and as illustrated in FIG. 7, the conductive inserts 310 could be formed as a trace 610 formed internal to an insulating insert 600. The trace 610 could be arranged to electrically couple to locations within an opening 612 formed in the insulating insert 600. In such a case, a substrate carrying connections as described above or as shown in FIG. 8, for example, is inserted into the opening 612 to complete the connection between traces in a manner similar to that described above but without requiring the use of a fastener.

Figure 8:
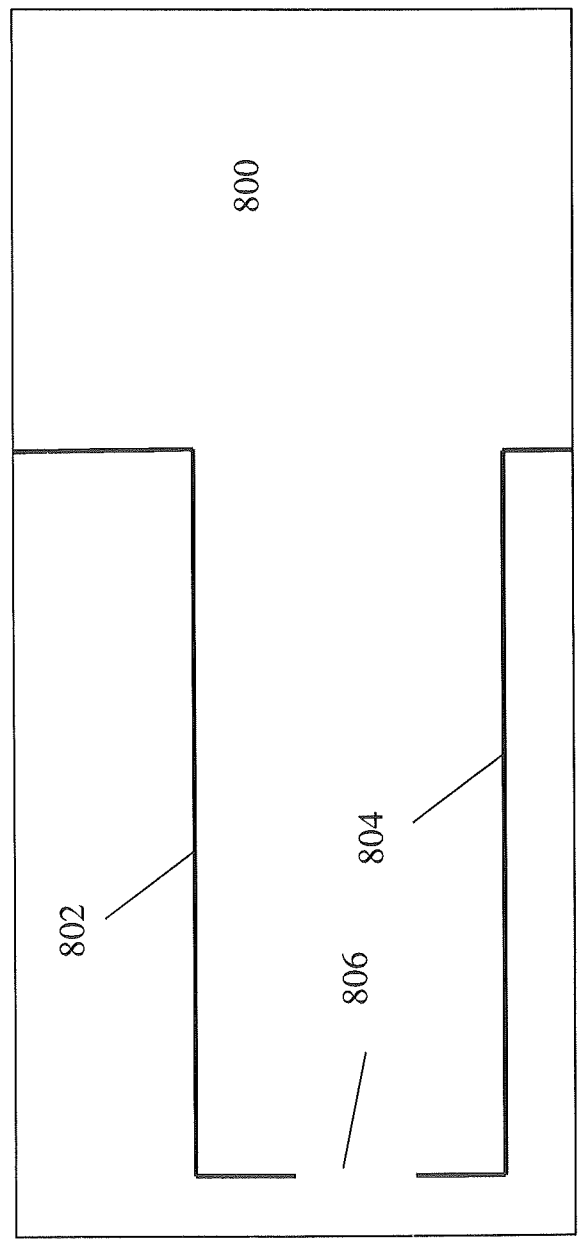
FIG. 8 depicts a bottom view of an access cover according to another embodiment.

Referring now to FIG. 8, a substrate 800 is shown carrying first and second conductors 802, 804. These conductors are separated from one another by a gap 806. This gap is bridged by trace 610 when substrate 800 is inserted into opening 612 (FIG. 7).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed:

1. A machine comprising:
   a high voltage element; and an enclosure surrounding the high voltage element, the enclosure including:
a first wall formed of an electrically conductive material;
a first insulating insert disposed at least partially within the first wall and being electrically non-conductive;
a first conductive insert at least partially disposed within the first insulating insert; and
an enclosure cover formed at least partially of an electrically non-conducting substrate and having a first opening formed therein sized to allow a first fastener or an extension of the first conductive insert to pass through it, the substrate including a first conductor terminating at a first location at or near an edge of the first opening and a second conductor terminating at a second location at or near the edge of the first opening and separated from the first location, the first and second conductors are electrically coupled to one another through the first conductive insert when the enclosure cover is placed into contact with the first conductive insert and electrically isolated from one another when the enclosure cover is at least partially removed from contact with the first wall.

2. The machine of claim 1, wherein the first and second conductors form part of a switch element that indicates that power is not to be output from the high voltage element when the first and second conductors are electrically isolated from one another.

3. The machine of claim 1, wherein the first fastener is non-conductive.

4. The machine of claim 1, wherein the enclosure further includes
a second insulating insert; and
a second conductive insert disposed at least partially within the second insulating insert;
wherein the enclosure cover includes a third conductor terminating at a first location at or near an edge of a second opening in the enclosure cover, the second conductor terminates at a second location at or near an edge of a second opening in the enclosure cover sized to allow a second fastener or an extension of the second conductive insert to pass through it and the second and third conductors are electrically coupled to one another through the second conductive insert when enclosure cover is placed into contact with the second conductive insert and electrically isolated from one another when the enclosure cover is at least partially removed from the enclosure.

5. The machine of claim 4, wherein the second insulating insert is located in the first wall.

6. The machine of claim 1, wherein the high voltage element is part of an electric motor and the first wall is a housing of the electric motor.

7. The machine of claim 1, further comprising:
an internal combustion engine.

8. The machine of claim 1, further comprising:
a power supply coupled to the high voltage element.

9. The machine of claim 1, wherein the high voltage element is a rectifier.

10. A machine comprising:
a high voltage element; and
an enclosure surrounding the high voltage element, the enclosure including:
a first wall formed of an electrically non-conductive material;
a first conductive insert at least partially disposed within the first wall; and
an enclosure cover formed at least partially of an electrically non-conducting substrate and having a first opening formed therein sized to allow either a first fastener or an extension of the first conductive insert to pass through it, the substrate including a first conductor terminating at a first location at or near an edge of the first opening and a second conductor terminating at a second location at or near the edge of the first opening and separated from the first location, the first and second conductors are electrically coupled to one another through the first conductive insert when the enclosure cover is placed into contact with the first conductive insert and electrically isolated from one another when the enclosure cover is removed from contact with the first wall.

11. The machine of claim 10, wherein the first and second conductors form part of a switch element that indicates that power is not to be output from the high voltage element when the first and second conductors are electrically isolated from one another.

12. The machine of claim 10, wherein the first fastener is non-conductive.

13. The machine of claim 10, wherein the enclosure further includes
a second conductive insert and the enclosure cover further includes a third conductor terminating at a first location at or near an edge of a second opening in the enclosure cover;
wherein the second conductor terminates at a second location at or near an edge of a second opening in the enclosure cover sized to allow a second fastener or an extension of the second conductive insert to pass through it and the second and third conductors are electrically coupled to one another through the second conductive insert when the enclosure cover is placed into contact with the second conductive insert and electrically isolated from one another when the enclosure cover is at least partially removed from the enclosure.

14. The machine of claim 13, wherein the second conductive insert is located in the first wall.

15. The machine of claim 11, wherein the high voltage element is part of an electric motor and the first wall is a housing of the electric motor.

16. The machine of claim 11, further comprising:
an internal combustion engine.

17. The machine of claim 16, further comprising:
a power supply coupled to the high voltage element.

18. The machine of claim 11, wherein the high voltage element is a rectifier.

19. The machine of claim 11, wherein the enclosure further includes a bottom formed of an electrically conductive material.

20. A dynamoelectric machine comprising:
a high voltage element; and
an outer housing surrounding the high voltage element, the outer housing including:
a first wall formed of an electrically conductive material;
a first insulating insert disposed at least partially within the first wall and being electrically non-conductive; and
a first conductive insert at least partially disposed within the insulating insert; and
an enclosure cover formed at least partially of an electrically non-conducting substrate and having a first opening formed therein sized to allow a first fastener or an extension of the first conductive insert to pass through it, the substrate including a first conductor terminating at a first location at or near an edge of the first opening and a second conductor terminating at a second location at or near the edge of the first opening and separated from the first location, the first and second conductors are electrically coupled to one another through the first conductive insert when the enclosure cover is placed into contact with the first conductive insert and electrically isolated from one another when the enclosure cover is at least partially removed from contact with the first wall.

21. The dynamoelectric machine of claim 20, wherein the high voltage element is a winding of an electric motor.

22. A machine comprising:

a high voltage element; and an enclosure surrounding the high voltage element, the enclosure including:

an insulating insert including an opening formed in a face thereof;

a conductive trace formed within the opening and electrically connecting two locations within the opening; and an enclosure cover formed at least partially of an electrically non-conducting substrate and having a first conductor terminating at a first location and a second conductor terminating at a second location separated from the first location, the first and second conductors are electrically coupled to one another through the conductive trace when the enclosure cover is placed into the opening and electrically isolated from one another when the enclosure cover is removed from the opening.

23. The machine of claim 22, wherein the insulating insert is disposed in an electrically conductive wall of the enclosure.

24. The machine of claim 23, wherein the electrically conductive wall of the enclosure is a housing of an electric motor.

\* \* \* \* \*